United States Patent
Schuttenberg et al.

(10) Patent No.: US 12,353,885 B2
(45) Date of Patent: Jul. 8, 2025

(54) SPECULATIVE EXECUTION FOLLOWING A STATE TRANSITION INSTRUCTION

(71) Applicant: Arm Limited, Cambridge (GB)

(72) Inventors: Kim Richard Schuttenberg, Gilbert, AZ (US); Rong Zhang, Chandler, AZ (US)

(73) Assignee: Arm Limited, Cambridge (GB)

( * ) Notice: Subject to any disclaimer, the term of this patent is extended or adjusted under 35 U.S.C. 154(b) by 249 days.

(21) Appl. No.: 16/827,852

(22) Filed: Mar. 24, 2020

(65) Prior Publication Data

US 2021/0303303 A1  Sep. 30, 2021

(51) Int. Cl.
*G06F 9/38* (2018.01)
*G06F 9/30* (2018.01)
*G06F 21/74* (2013.01)

(52) U.S. Cl.
CPC ........ *G06F 9/38585* (2023.08); *G06F 9/3005* (2013.01); *G06F 9/30072* (2013.01); *G06F 9/30076* (2013.01); *G06F 9/3842* (2013.01); *G06F 21/74* (2013.01)

(58) Field of Classification Search
CPC .. G06F 9/3005; G06F 9/30076; G06F 9/3842; G06F 9/3857; G06F 9/3859; G06F 21/74; G06F 9/30189
See application file for complete search history.

(56) References Cited

U.S. PATENT DOCUMENTS

| | | | |
|---|---|---|---|
| 6,430,674 B1 * | 8/2002 | Trivedi | G06F 9/30076 712/209 |
| 9,762,399 B2 * | 9/2017 | Ghose | G06F 12/0855 |
| 2014/0101412 A1 * | 4/2014 | Ramirez | G06F 9/3861 712/205 |
| 2018/0232233 A1 * | 8/2018 | Wright | G06F 9/3842 |

\* cited by examiner

*Primary Examiner* — David J. Huisman
(74) *Attorney, Agent, or Firm* — NIXON & VANDERHYE P.C.

(57) ABSTRACT

Processing circuitry executes instructions from an instruction stream comprising a state transition instruction followed by a further instruction. The processing circuitry is responsive to the state transition instruction to change a security state of the processing circuitry. Issue circuitry issues the further instruction to be speculatively executed prior to the state transition instruction being completed, and the further instruction has a requirement with respect to the security state. Completion circuitry performs a completion operation on the further instruction comprising checking whether the requirement with respect to the security state is met.

10 Claims, 14 Drawing Sheets

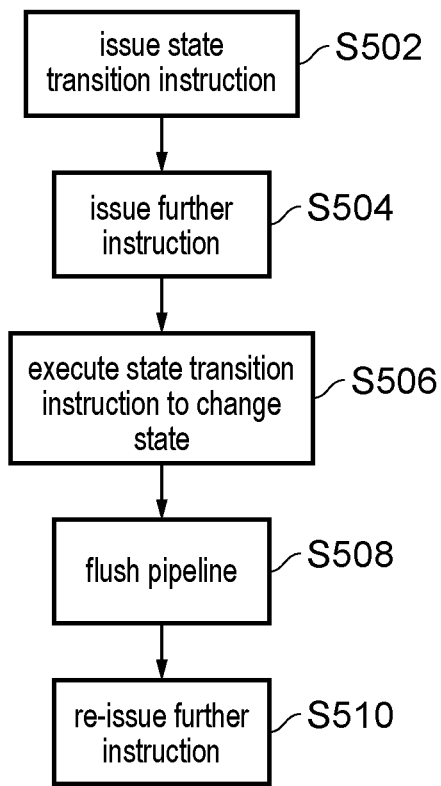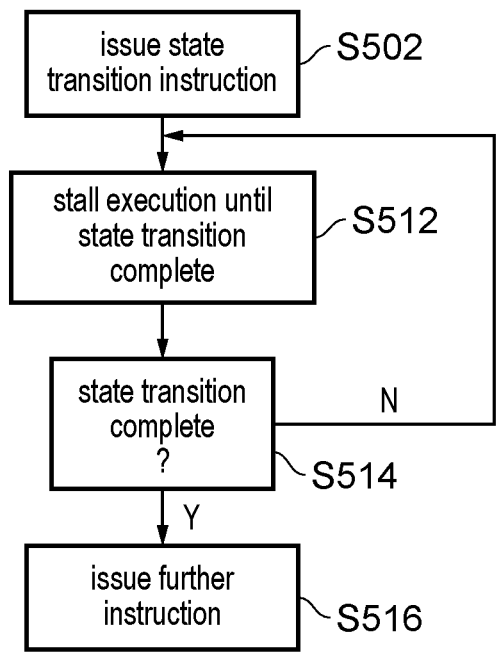
FIG. 5A
FIG. 5B

SPECULATIVE EXECUTION FOLLOWING A STATE TRANSITION INSTRUCTION

BACKGROUND

Technical Field

The present technique relates to the field of data processing systems.

Technical Background

Some data processing systems are capable of being operated in any of a plurality of security states, in which access to certain data is restricted to instructions being executed in certain of those security states. This allows selected data to be kept secure, by preventing operations executed in different security states from accessing them.

In such systems, instructions may have a particular requirement in respect of the security state, indicating a certain security state in which they are allowed to be executed. Therefore, when switching between security states of the processing system, it is necessary to prevent instructions, which are part way through the execution pipeline at the time of the change in security state, from being executed in a disallowed state. One way of achieving this is to assume that the security requirements of any instructions part way through the pipeline at the time of the change in security state do not match the updated security state, and to flush the pipeline every time the security state of the data processing system is changed. However, this approach can have significant a performance impact on the system. In particular, there are known performance impacts associated with performing flushes—for example, due to the fact that any flushed instructions may need to be re-issued and re-executed.

It would thus be advantageous to improve the performance of a data processing system following a change in security state.

SUMMARY

Viewed from one example, the present technique provides an apparatus comprising: processing circuitry adapted to execute instructions from an instruction stream comprising a state transition instruction followed by a further instruction, wherein the processing circuitry is responsive to the state transition instruction to change a security state of the processing circuitry; issue circuitry adapted to issue the further instruction to be speculatively executed prior to the state transition instruction being completed, the further instruction having a requirement in respect of the security state; and completion circuitry adapted to perform a completion operation on the further instruction comprising checking whether the requirement in respect of the security state is met.

Viewed from another example, the present technique provides a method comprising: executing instructions from an instruction stream comprising a state transition instruction followed by a further instruction; responsive to the state transition instruction, changing a security state of the processing circuitry; issuing the further instruction to be speculatively executed prior to the state transition instruction being completed, the further instruction having a requirement in respect of the security state; and performing a completion operation on the further instruction comprising checking whether the requirement in respect of the security state is met.

Viewed from another example, the present technique provides an apparatus comprising: means for executing instructions from an instruction stream comprising a state transition instruction followed by a further instruction; means for changing a security state of the processing circuitry, responsive to the state transition instruction; means for issuing the further instruction to be speculatively executed prior to the state transition instruction being completed, the further instruction having a requirement in respect of the security state; and means for performing a completion operation on the further instruction comprising checking whether the requirement in respect of the security state is met.

Viewed from another example, the present technique provides an apparatus comprising: processing circuitry to execute instructions; prediction circuitry to generate a prediction of a supplementary operation required by one or more of the instructions; and injection circuitry to cause microcode corresponding to the supplementary operation to be injected into the processing circuitry in response to the prediction.

Viewed from another example, there is provided a method comprising: executing instructions; generating a prediction of a supplementary operation required by one or more of the instructions; and injecting microcode corresponding to the supplementary operation into the processing circuitry in response to the prediction.

Viewed from another example, there is provided an apparatus comprising: means for executing instructions; means for generating a prediction of a supplementary operation required by one or more of the instructions; and means for injecting microcode corresponding to the supplementary operation into the processing circuitry in response to the prediction.

Further aspects, features and advantages of the present technique will be apparent from the following description of examples, which is to be read in conjunction with the accompanying drawings.

BRIEF DESCRIPTION OF THE DRAWINGS

FIGS. 5A to 5C are flow diagrams illustrating the execution of state transition instructions;

DESCRIPTION OF EXAMPLES

Figure 1:
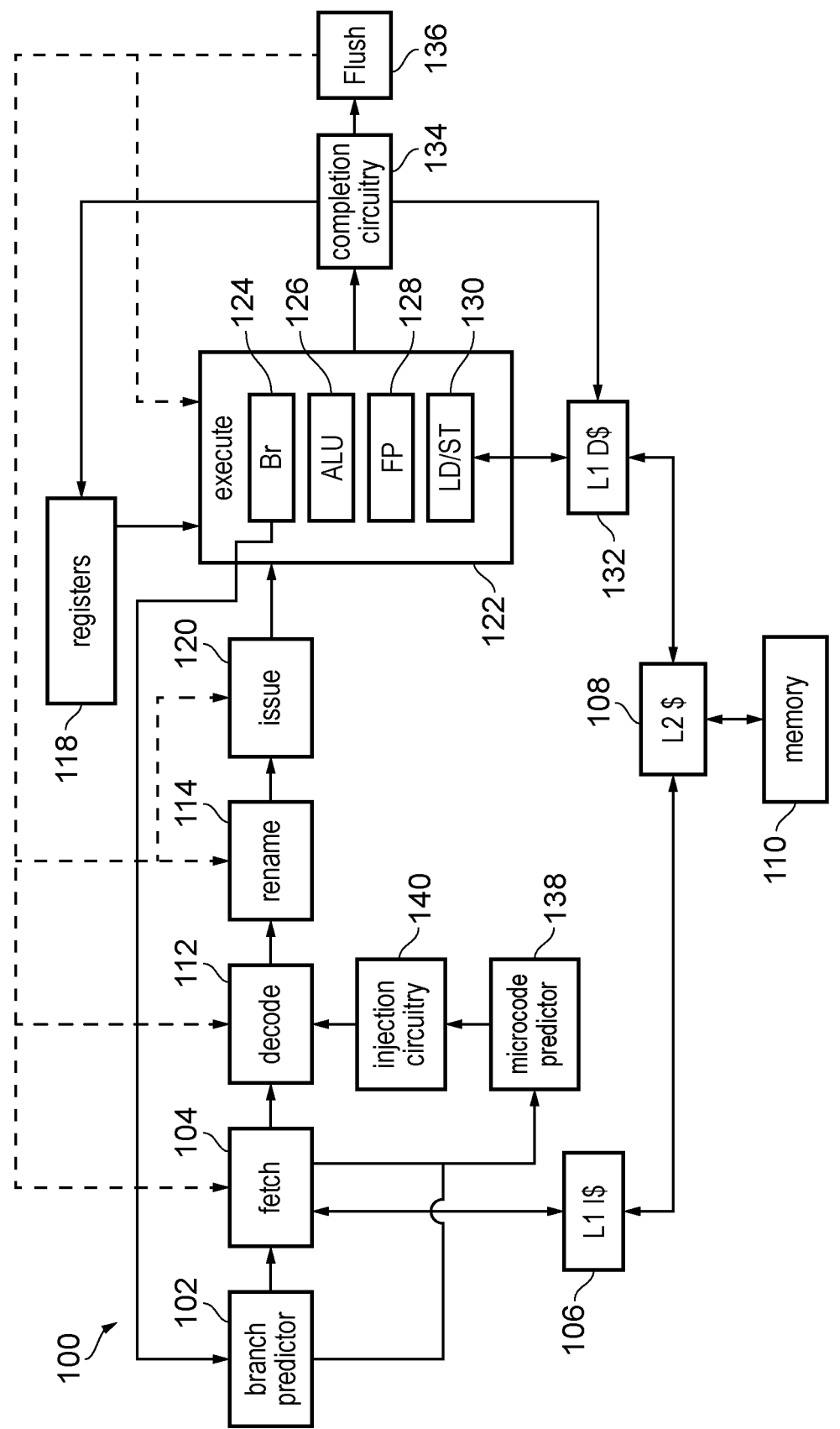
FIG. 1 illustrates a data processing system in which the present techniques may be applied.

In accordance with one example configuration there is provided an apparatus comprising: processing circuitry adapted to execute instructions from an instruction stream comprising a state transition instruction followed by a further instruction, wherein the processing circuitry is responsive to the state transition instruction to change a security state of the processing circuitry; issue circuitry adapted to issue the further instruction to be speculatively executed prior to the state transition instruction being completed, the further instruction having a requirement in respect of the security state; and completion circuitry adapted to perform a completion operation on the further instruction comprising checking whether the requirement in respect of the security state is met.

In accordance with the present technique, an instruction following a state transition instruction (a further instruction) is issued regardless of whether its requirement in respect of a security state aligns with the current security state of the operating system, and a check of whether the security requirements of the instruction are met is carried out at completion (e.g. before or during completion) of the instruction by the completion circuitry. This avoids the need for the processing circuitry to assume that the requirements of any instructions part way through execution do not match the updated security state of the operating system, so that a flush does not need to be triggered in response to every change in security state. This allows the performance of the system to be improved by reducing the likelihood of a pipeline flush, thus avoiding the performance impact associated with a flush. Furthermore, the present technique does not rely on stalling the insertion of instructions into the pipeline until it can be determined whether the appropriate security state requirements are met, which would also be inefficient. This may be counterintuitive to a skilled person, since it allows an instruction to be executed even if the security state of the processing circuitry at the time of issuing the instruction does not meet the requirement in respect of a security state associated with the instruction. One of ordinary skill in the art may expect that this would risk compromising the security of operations associated with the issued instruction. However, by providing completion circuitry to perform a check, as part of a completion operation, of whether the requirement in respect of the security state is met, the security in the system can be maintained.

In some examples, the security state is one of a first security state and a second security state; the processing circuitry is responsive to the state transition instruction to transition from the first security state to the second security state; and the requirement in respect of the security state indicates a required security state, and the completion operation comprises checking whether the required security state matches the second security state.

In such examples, the requirement in respect of the security state (also referred to as a security requirement) is a security state of the processing circuitry in which the further instruction is expected to be executed. However, in accordance with these examples, the further instruction can still be issued by the issue circuitry regardless of whether the requirement in respect of the security state is met at the time of issuing the further instruction, since the security requirement is not checked until the completion operation is carried out by the completion circuitry. In particular, since the state transition instruction of this example causes the processing circuitry to transition from the first security state to the second security state, the completion circuitry checks whether the required security state of the further instruction matches the second security state. However, this check is not carried out until the completion stage, meaning that the further instruction can still be issued and speculatively executed before the state transition has been carried out. This improves the performance of the system, by avoiding the need for a flush to be triggered after the state change.

In some examples, the completion operation comprises: when the completion circuitry determines that the required security state matches the second security state, completing the further instruction; and when the completion circuitry determines that there is a mismatch between the required security state and the second security state, triggering a flush.

Triggering a flush when there is a mismatch between the required security state and the second security state, before the further instruction is completes, protects data that would have been accessed by that instruction from being accessed in the wrong security state. This improves the security of the system. There is a performance impact associated with a flush, and so a skilled person may be concerned that this would negate the performance benefits of speculatively executing the further instruction as in the present technique. However, it is likely that the further instruction will have a security state matching the second security state, especially at the time of completion, and thus the likelihood of a flush being triggered by the completion operation is small enough that the performance gains still outweigh the negative impact of the flush.

In some examples, the further instruction indicates a target address, the target address having a security attribution indicative of the requirement in respect of the security state.

There are numerous ways in which the requirement of the further instruction in respect of the security state may be indicated, but in this example the further instruction indicates a target address, which itself has a security attribution indicating a requirement in respect of the security state. The target address can therefore be used to identify this requirement. This is a simple and effective way of identifying the security requirement of the further instruction without requiring the instruction itself to be tagged with any additional information.

In some examples, during speculative execution of the further instruction, the processing circuitry is adapted to delay a state update in respect of the further instruction. The state update could be implicit in the sense that a structure (e.g. memory or a cache) is updated as a consequence of a non-write operation taking place. During this delay, any update that would occur to the structure is instead written to local storage. For instance, a read from memory causes a state update in the cache if the read data is stored to the cache (a cache line fill). In these embodiments, such an (implicit) state update is delayed. For instance, taking the example of the cache update, having retrieved the data from memory, the data is stored in local storage and after the delay has occurred, the data is stored into the cache. Another example of an (implicit) state update is an update to a branch predictor. Adding a delay in this way helps to avoid the situation in which the update has a security state requirement that is not met by the security state of the processing circuitry. The delay makes it possible to the security state to be switched to the correct state before the update occurs, which maintains the security of the system. In some examples, the further instruction is part of a block of instructions, each having an identical requirement in respect of the security state; and the state update updates at least one data value visible to instructions outside of the block of instructions.

In such examples, a state update is an update to a location that is visible to instructions outside of a current block of instructions being executed. Since it has not yet been confirmed whether the further instruction is allowed to be completed (due to its requirement in respect of the security state), it cannot be guaranteed that any state updates made by the further instruction are correct. Thus, delaying state updates such as these improves the security of the system by preventing instructions outside of the current block from accessing data which may be incorrect. In some examples, the delayed state update is still visible to instructions within the block of instructions. For example, instructions in the block of instructions could be permitted to access the local storage within the processing circuitry, while instructions outside of the block of instructions could be prevented from accessing the local storage.

In some examples, the state update updates the at least one data value in at least one of: a cache; a register file; and a memory.

Caches, register files and memory may be visible to instructions outside of the current block of instructions. Therefore, delaying state updates to these structures while speculatively executing the further instruction improves the security of the updates.

In some examples, the completion operation comprises, when the completion circuitry determines that the requirement in respect of the security state is met, issuing the state updates.

When the completion operation confirms that the security requirement of the further instruction has been met, state updates generated in response to the further instruction can be trusted. Thus, the delayed state updates can then be completed (e.g. structures such as caches, registers and the memory can be updated, as indicated by the delayed state updates).

In some examples, the security state is one of a secure state and a non-secure state.

The data processing system may be capable of operating in any number of security states, but in some examples, the security state is one of two states-a secure state and a non-secure state. In such a system, processes may be tagged as either secure or non-secure, depending on whether they are considered to be trustworthy. Certain memory areas and other critical resources available to the processing circuitry can therefore be identified as being secure, so that access to those resources depends on the processing circuitry operating in the secure state, under the control of a program that is considered to be trustworthy.

In some examples, the requirement in respect of the security state indicates a required security state; and the completion operation comprises, when the required security state is the non-secure state, completing the further instruction.

In such examples, when the processing circuitry is in the secure state, execution of both secure and non-secure instructions is permitted. Therefore, if the security state requirement of the further instruction indicates the non-secure state, the completion operation comprises completing the further instruction regardless of whether the security state requirement is met. This is acceptable, since instructions whose requirement in respect of the security state indicate the non-secure state do not require trust (e.g. they are not expected to trigger accesses to resources that are tagged as secure). Therefore, it can be considered safe to execute these instructions regardless of the current security state of the processing circuitry. This allows for an improvement in the performance of the system, since the processing circuitry does not need to wait for the security state of the further instruction to match the security state of the processing circuitry before completing the further instruction when the required security state is the non-secure state.

In some examples, the processing circuitry is responsive to the state transition instruction to transition from the secure state to the non-secure state; the requirement in respect of the security state indicates a required security state; and the completion operation comprises checking whether the required security state is the non-secure state.

As noted above, when the processing circuitry is executing in the non-secure state, critical resources tagged as secure cannot be accessed, protecting the resources from accesses by programs which are not considered trustworthy enough to be allowed to operate in the secure state. As a result when the processing circuitry is executing in the non-secure state an instruction, whose requirement in respect of the security state indicates the secure state, should not be allowed to be completed since it may trigger accesses to resources that are tagged as secure, which is not permitted when the processing circuitry is executing in the non-secure state. Hence, when the processing circuitry is operating in the non-secure state (following a state transition instruction to transition a state of the processing system from the secure state to the non-secure state), instructions with a security requirement indicating the non-secure state are allowed to be completed. Therefore, the completion operation comprises checking whether the required security state is the non-secure state. This improves the security of the system by protecting any secure data from being accessed by non-secure instructions.

In a data processing system, some operations executed by processing circuitry may require one or more supplementary operations to also be executed. These supplementary operations may be injected into the processing pipeline in the form of microcode when it is determined that they are needed. Typically, when it is determined that an operation requires supplementary operations to be executed, the pipeline is flushed of all instructions following that operation, before the microcode corresponding with the supplementary operations is injected. This allows the supplementary operations to be executed with (e.g. alongside or immediately after) the operation requiring the supplementary operations. It would therefore be advantageous to provide an improved method for injecting microcode.

In accordance with one example configuration there is provided processing circuitry to execute instructions; prediction circuitry to generate a prediction of a supplementary operation required by one or more of the instructions; and injection circuitry to cause microcode corresponding to the supplementary operation to be injected into the processing circuitry in response to the prediction.

Supplementary operations required by the one or more instructions are operations which, when executed, enable or support the execution of the one or more instructions. By using the prediction circuitry to predict a supplementary operation required by one or more operations being executed by the processing circuitry, it can be determined in advance whether corresponding microcode should be injected into the pipeline. This allows the microcode to be injected earlier (e.g. before the operations requiring the supplementary operations have reached an execution stage of the processing pipeline), reducing the number of instructions that need to be flushed from the pipeline (e.g. because fewer instructions will have been issued between the issuing of the operation requiring the supplemental operations and the injection of the microcode). This is advantageous, as it reduces the performance impacts associated with performing flushes—for example, due to the fact that any flushed instructions may need to be re-issued and re-executed. The prediction can take any of a number of forms. For example, the prediction could merely be a prediction of whether or not the supplementary operations are required, while in other examples it could be a prediction of which supplementary operations are required.

In some examples, the prediction circuitry is adapted to generate the prediction based on the one or more of the instructions.

In such examples, the prediction circuitry observes characteristics of the one or more instructions, and bases a prediction of whether the supplementary operation is needed on these characteristics. Examples of characteristics observed by the prediction circuitry include the type of operation that will be executed in response to the instruction, and a memory location identified by the instruction (if the instruction is a data access instruction such as a load or a store instruction).

In some examples, there is provided branch prediction circuitry to generate a predicted direction of a branch instruction; wherein the prediction circuitry is adapted to generate the prediction based on the predicted direction.

The outcome of a branch instruction determines which of a number of different instruction sequences will be executed next. If one or more instructions in the selected instruction sequence would require supplementary operations to be executed, then the outcome of the branch instruction indicates whether or not these supplementary operations need to be injected into the processing circuitry. Therefore, in this example, the outcome of a branch prediction made by branch prediction circuitry is used to predict whether or not supplementary operations are needed by the processing circuitry—for example, if the branch prediction predicts that processing will branch to an instruction stream including one or more instructions requiring supplementary operations, the prediction circuitry will predict that the supplementary instructions are needed and inject them into the processing circuitry. Thus, the prediction circuitry according to the present technique can base its prediction on information supplied by existing structures within a data processing system. This allows the present technique to be implemented with minimal adaptation to the design of an existing data processing system, since it utilises existing structures such as branch prediction circuitry.

In some examples, in response to the prediction, the processing circuitry is adapted to stall execution of the instructions until the microcode is injected into the processing circuitry.

In such examples, when the prediction circuitry predicts that the supplementary operation will be required by the one or more instructions, the processing circuitry stalls execution of any further instructions until the microcode is inserted. This improves the performance of the system by reducing the number of instructions that are issued between issuing the instruction requiring the supplementary operations, and inserting the microcode. This, in turn, reduces the number of instructions that will need to be flushed from the pipeline when the microcode is injected. If processing is stalled immediately after the instructions requiring the supplementary operations are issued, the microcode can be inserted without needing to flush intervening instructions from the pipeline, since no further instructions will have been issued. Moreover, even if processing is not stalled immediately after the issue of the instructions requiring the supplementary operations, there is still a performance benefit to stalling the pipeline, since doing so will reduce the number of intervening instructions that need to be flushed (e.g. if the pipeline is flushed three cycles after the issuing of the instructions requiring the supplementary operations, then only three cycles worth of instructions will need to be flushed from the pipeline when the microcode is injected).

In some examples, the processing circuitry is adapted to determine, in response to the one or more of the instructions, whether the supplementary operation is required; and when it is determined that the supplementary operation is required, the injection circuitry is adapted to cause the microcode to be injected into the processing circuitry, and the processing circuitry is adapted to resume execution of the instructions.

By delaying injecting the microcode until it is determined that it is actually needed, the microcode does not need to be injected immediately after the prediction is made-instead, processing can be stalled until it is determined whether the operations are actually needed (e.g. processing may be stalled until the instructions requiring the supplementary operations reach the execute stage). This avoids the need for the microcode to be flushed from the pipeline if the prediction later turns out to have been incorrect, avoiding the negative performance impacts associated with the flush.

In some examples there is provided flush circuitry to generate a flush in response to the prediction being incorrect.

In these examples, if the prediction later turns out to have been incorrect, flush circuitry removes the microcode from the pipeline by executing a flush. This approach can be beneficial to implement the present technique, since the performance gains from speculatively injecting the microcode when the prediction is correct outweigh the impact of the flushing the pipeline in the few instances where the prediction is incorrect.

In some examples, the processing circuitry is adapted to suppress execution of the supplementary operation in response to the prediction being incorrect.

In these examples, an incorrect prediction is dealt with by suppressing the execution of the supplementary operation. This prevents execution of the supplementary operation-which were injected incorrectly, due to the incorrect prediction-without needing to flush the supplementary operations from the pipeline. Thus, the negative performance impact of a flush can be avoided.

In some examples there is provided masking circuitry to suppress the execution of the supplementary operation by applying a predicate to mask the supplementary operation.

In some situations, it may be appropriate to keep the microcode in the pipeline even when the prediction is determined to be incorrect. One situation in which this might be appropriate is when the microcode has a limited effect on the system (e.g. if the microcode does not change anything architectural such as the program counter). Instead, in these examples, execution of the supplementary operations can be suppressed (if the prediction is incorrect) by applying a predicate (e.g. a condition) to the microcode. The masking circuitry can therefore be arranged to apply a predicate to the microcode before it is inserted into the processing circuitry, wherein the predicate is a condition indicating that if the prediction is incorrect, either the microcode should not be executed or the results of the execution of the microcode should be discarded. As a result, the pipeline does not need to be flushed in response to an incorrect prediction, and the negative performance impacts of a flush can be avoided.

In some examples, the processing circuitry is adapted to execute the instructions in a security state; the supplementary operation is a state transition initialising operation, and the prediction circuitry generates the prediction based on a required change in the security state; and the processing circuitry is adapted to respond to the state transition initialising operation by initialising the processing circuitry for the required change in the security state.

A situation in which the present technique of inserting microcode corresponding to supplementary operations can be beneficial is when transitioning from one security state of the processing circuitry to another. In such a system, processes may be associated with a particular security state (in some examples, this could be either "secure" or "non-secure"), indicating which security state the processing circuitry needs to be operating in in order to execute those processes. For example, the security state of a particular process could be set in dependence on whether it is considered to be trustworthy. Certain memory areas and other critical resources available to the processing circuitry can therefore be identified as being accessible to the processing circuitry when it is executing in a particular security state, so that access to those resources is restricted to when the processing circuitry is operating in that security state.

In particular, a change in the state of the security circuitry may require a supplementary operation to be performed, such as a state transition initialising operation to initialise the processing circuitry for the required change in security state. Therefore, in some examples, the prediction circuitry predicts whether a state transition initialising operation is needed based on a required change in security state, and injects corresponding microcode when it is needed.

In some examples, a subset of the instructions each indicate an address having a security attribution indicative of a requirement in respect of the security state; and the prediction circuitry is adapted to generate the prediction based on the security attribution of each of the subset of the instructions.

There are a number of ways in which the prediction circuitry may be adapted to predict whether a state transition initialising operation is needed by the processing circuitry, but in this example the prediction circuitry is adapted to make the prediction based on the security attributions of addresses identified by instructions to be executed. For example, the prediction circuitry could identify a change in security attributions between instructions in the subset of instructions, which may indicate that a state transition is imminent or even necessary.

In some examples, the subset of the instructions are memory access instructions; and the address is a memory access address.

As discussed above, certain memory areas can be identified as being accessible to the processing circuitry when it is executing in a particular security state, so that access to those resources can be restricted to when the processing circuitry is operating in that security state. In these examples, particular memory addresses have security attributions indicative of whether they address locations in secure memory or non-secure memory. Memory locations with security attributions indicating the secure state can typically not be accessed unless the processing circuitry is operating in the secure state, under the control of a program that is considered to be trustworthy. Indicating the security attribution of memory access instructions based on the memory access address is therefore a particularly simple technique for indicating the security attribution, without any additional tags or information being needed in the instruction.

In some examples, the address of each instruction in the subset of the instructions identifies a storage location at which that instruction is stored in a storage circuitry.

Another way that the security attribution of an instruction can be identified is based on a storage location of that instruction in storage circuitry. For example, this might indicate whether the instruction itself was stored in secure memory or non-secure memory.

In some examples, the instructions comprise a branch instruction; the apparatus comprises branch prediction circuitry to generate a predicted direction of the branch instruction; and the prediction circuitry is adapted to generate the prediction when the predicted direction indicates the required change in the security state.

Another way in which the prediction circuitry can be adapted to predict whether a state transition initialising operation is needed is based on a prediction generated by branch prediction circuitry. A branch instruction executed by the processing circuitry may cause a stream of instructions to be executed that require the processing circuitry to be in a different security state to the security state of the processing circuitry at the time the branch instruction was executed. Therefore, in some examples, the predicted direction of a branch instruction is used to predict whether or not a state transition initialising operation is needed. This example of the present technique can therefore be implemented using existing structures such as branch prediction circuitry.

In some examples, the predicted direction indicates a branch target address of the branch instruction; and the branch target address has a security attribution indicative of a requirement in respect of the security state.

The predicted direction of a branch instruction may take any of a number of forms. In some examples, the predicted direction indicates whether a branch is expected to be "taken" or "not taken". However, in these examples, the predicted direction takes the form of a prediction of a branch target address. In such examples, since the security attribution of a predicted branch target address indicates the security state that the processing circuitry would need to be operating in to execute the associated instruction, it can be used to predict whether a state transition initialising operation will be needed. Since this uses existing branch prediction structures, and information (such as the security attribution) that is easily derivable from the target address, it is a particularly efficient implementation of the present technique.

In some examples, the one or more of the instructions correspond with an array access operation, wherein the array access operation identifies a location of an array and an index of the array; the supplementary operation is an array bounds check operation; and the processing circuitry is adapted to respond to the array bounds check operation by comparing the index with an array size of the array and returning an error indication when the index is outside of the array size.

Supplementary operations may be needed by the processing circuitry for carrying out an array bounds check. An array bounds check comprises checking whether an element identified by an array access operation is a valid element within an array (e.g. whether the index identified by the array access falls within the bounds of the array). In particular, if an array access operation is executed by the processing circuitry, an array bounds check may be needed depending on attributes of the array access operation and of the array itself. Therefore, in these examples, the prediction circuitry is arranged to predict whether an array access operation to be executed requires the injection of microcode corresponding to an array bounds check. The exact mechanism used to predict whether an array bounds check is needed may vary, but in some examples a prediction is based on a determination of whether a previous array access operation identifying the same target address required an array bounds check. Predicting whether an array bounds check will be needed, before the array access operation reaches the execute stage, reduces the likelihood that the pipeline will need to be flushed if it is later determined that the array bounds check will be needed, thus reducing the negative performance impacts associated with flushes.

In some examples, there is provided decode circuitry to decode the instructions; wherein the injection circuitry injects the microcode into the decode circuitry.

This is a simple implementation of the present technique that can be applied using existing structures such as decode circuitry, and is particularly advantageous since it does not require the injected microcode to be decoded prior to being injected into the processing circuitry. However, it should be noted that it is also possible for the microcode to be injected into a different part of the processing circuitry. For example, the microcode could be injected after the decode circuitry, provided that it has already been decoded.

Particular embodiments will now be described with reference to the figures.

FIG. 1 illustrates an example of a data processing apparatus 100 having a processing pipeline comprising a number of pipeline stages. The pipeline includes a branch predictor 102 for performing predictions related to branch instructions. For example, the branch predictor may predict a direction that would be taken by a branch instruction, and/or it might predict the target address of a branch instruction.

The pipeline also includes a fetch unit/stage 104, which fetches instructions from the instruction cache 106 or other memory structures 108, 110. The fetch stage 104 fetches the instructions identified by the fetched addresses, and a decode stage 112 decodes the fetched instructions to generate control signals for controlling the subsequent stages of the pipeline. The instructions fetched by the fetch unit 104 may be dependent on the branch prediction supplied by the branch predictor 102. In particular, if the branch predictor 102 predicts that a branch will be taken, then the instructions that are fetched will be at a location indicated by the branch.

A rename stage 114 performs register renaming to map architectural register specifiers identified by the instructions to physical register specifiers identifying registers 118 provided in hardware. An issue stage 120 includes an issue queue which queues instructions awaiting execution until the required operands for processing those instructions are available in the registers 118, and selection circuitry to select instructions for execution by the execute stage 122. The execute stage 122 executes the instructions to carry out the corresponding processing operations, and the results of the executed instructions are written back to the registers 118. The execute stage 122 includes a number of execution units such as a branch unit 124 for evaluating whether branch instructions have been correctly predicted, an ALU (arithmetic logic unit) 126 for performing arithmetic or logical operations, and FPU (floating-point unit) 128 for performing operations using floating-point operands and load/store unit 130 for performing load operations to load data from memory to the registers 118 or store operations to store data from the registers 118 to the memory system. In this example the memory system includes a level one instruction cache 106, a level one data cache 132, a level two cache 108 which is shared between data and instructions, and main memory 110. However it will be appreciated that this is just one example of a possible memory hierarchy and other implementations can have further levels of cache or a different arrangement. Access to memory may be controlled using a memory management unit (MMU) for controlling address translation and/or memory prediction.

The pipeline also includes a completion stage 134. Once instructions have been executed by the execute unit 122, they are completed in a completion operation carried out by the completion circuitry 134. Completion of instructions includes, for example, writing back to any registers 118, writing to the memory system, and performing any other necessary state updates. The completion operation performed by the completion circuitry 134 could also include checking security state requirements of executed instructions, as will be discussed in more detail below.

Flush circuitry 136 is also provided, which responds to certain triggers to generate a flush, to clear all non-completed instructions from the pipeline. As is illustrated by dotted lines in FIG. 1, the flush circuitry 136 may operate on the fetch stage 104, the decode stage 112, the rename stage 114, the issue stage 120, and/or the execute stage 122.

The data processing system 100 described in FIG. 1 is configured to operate in one of a number of security states. For example, the data processing system 100 in FIG. 1 executes in one of a secure state and a non-secure state, and instructions executed by the processing circuitry indicate which of the secure state and the non-secure state is the required security state for execution of the instruction. Similarly, the memory 110 may be partitioned into a secure memory region and a non-secure memory region, and instructions executed while the processing circuitry is in the non-secure state may be forbidden from accessing data stated in the secure regions of memory. The data processing system 100 is capable of transitioning from one security state to the other—for example, in response to a state transition instruction.

As will be discussed in more detail below, instructions following a state transition instruction may be speculatively executed without first checking that any security requirement they identify is met by the current security state of the system. The completion circuitry 134 is configured to check, during a completion operation, whether the security state requirement of an executed instruction is met by the current security state of the system. If it is determined, at this stage, that the security attribution of an executed instruction does not match the current security state of the system, the flush circuitry is triggered to flush the pipeline.

The data processing system 100 also includes a microcode predictor 138 for predicting whether one or more supplementary operations will be needed by operations being executed by the execute stage 132. The microcode predictor may make predictions based on instructions that have been fetched by the fetch unit 104 or by branch predictions made by the branch predictor 102, for example, or based on the security attributions of instructions fetched by the fetch unit 104. If it is predicted that supplementary operations are required by the execute stage 122, injection circuitry 140 injects the microcode corresponding to those supplementary operations into the decode stage 112. This process will be described in more detail below.

It will be appreciated that the pipeline shown in FIG. 1 is just one example and other examples may have different sets of pipeline stages for execution units. For example, an in-order processor may not have a rename stage 118.

Figure 2:
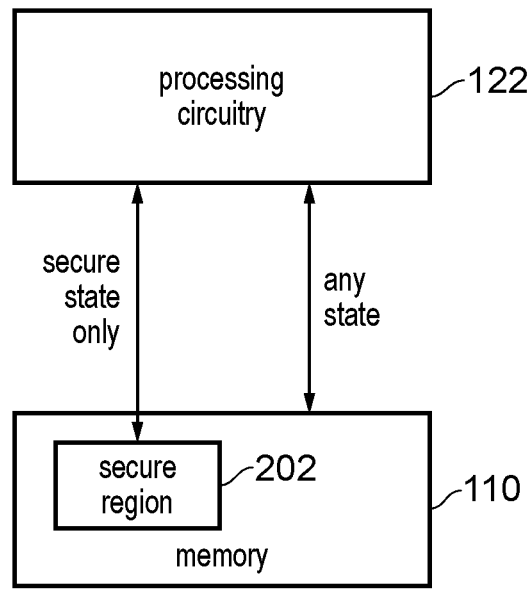
FIG. 2 illustrates processing circuitry accessing data stored in memory with a secure region.

FIG. 2 illustrates accesses to memory by the processing circuitry (execution circuitry) 122. As mentioned above, the memory 100 may be partitioned to include a secure region 202, with the remaining portion of the memory 110 being a non-secure region. Data in the secure region 202 is protected from accesses by the processing circuitry 122 when it is operating in the non-secure state—the processing circuitry, when operating in the non-secure state, is allowed to access memory items stored in the non-secure region of memory, but is not allowed to access memory items in the secure region of memory. On the other hand, when the processing circuitry is executing in the secure state, the processing circuitry 122 is able to access data in either within the secure region 202 or outside the secure region.

Figure 3:
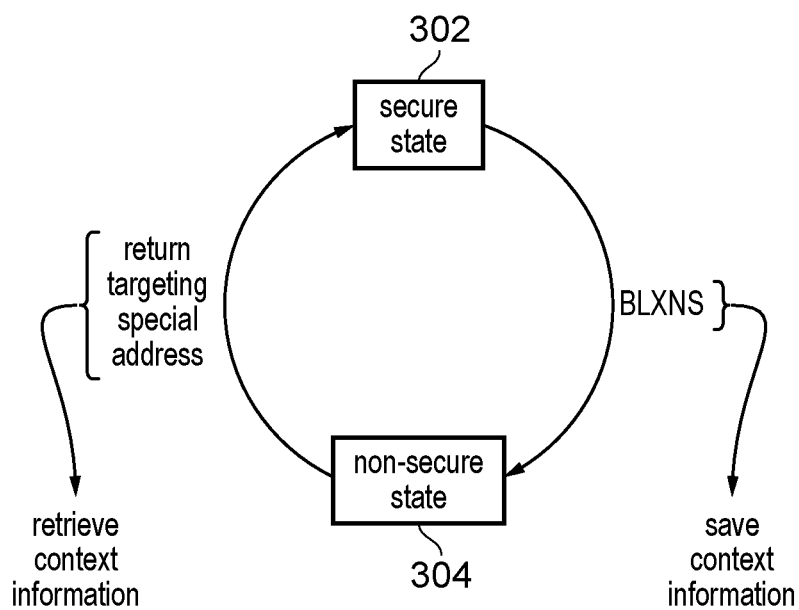
FIG. 3 illustrates transitions between a secure operating state and non-secure operating state.

FIG. 3 illustrates how the processing circuitry 122 may transition between a secure state 302 and a non-secure state 304. The processing circuitry may be triggered to change security state based on an instruction. For example, as shown in FIG. 3, a dedicated state transition instruction such as a Branch with Link and Exchange Non-secure (BLXNS) instruction may be executed to cause the processing circuitry to transition from the secure state 302 to the non-secure state 304. The BLXNS instruction also causes the processing circuitry to save context information indicative of the state of the system prior to the state change. It will be appreciated that, while the instruction shown in the diagram is a BLXNS instruction, any dedicated state transition instruction to change the state of the processing circuitry may be used.

Subsequently, the processing circuitry may be triggered to return from the non-secure state 304 to the secure state 302, in response to a return targeting a special address. For example, this may be an address value reserved for the purpose of identifying that a state transition from the non-secure state 304 to the secure state 302 is required. In response to such an address being identified, the processing circuitry retrieves the context information saved in response to the BLXNS instruction, and changes the state of the processing circuitry to the secure state 302. It will be appreciated that the state transition process depicted in FIG. 3 is just one example, and other processes are also possible. For example, different triggers may cause the state transitions to occur, instead of the BLXNS instruction and the instruction targeting a special address.

Figure 4:
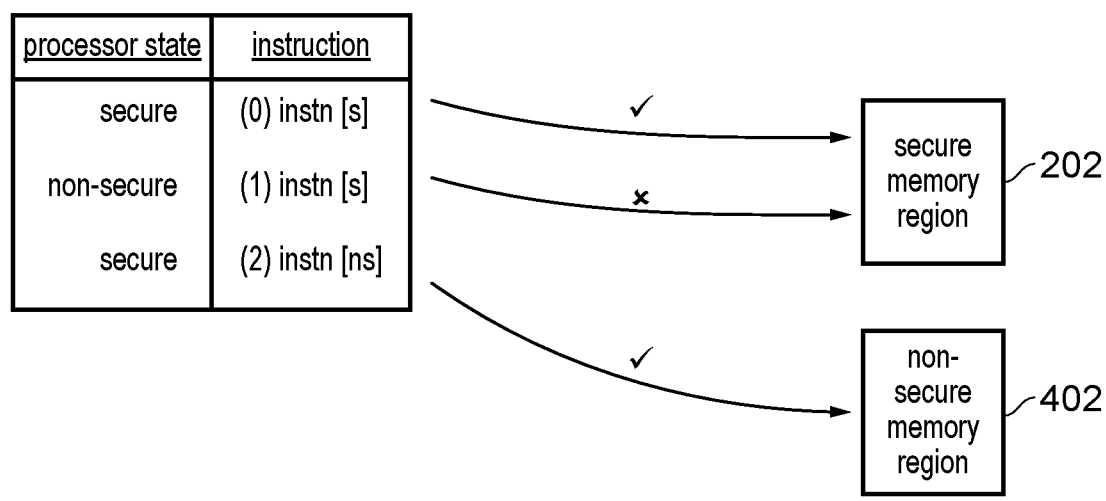
FIG. 4 illustrates data accesses to memory by instructions executed in various security states.

FIG. 4 illustrates how data accesses to addresses in memory can be controlled based on the security attributions of their target addresses. FIG. 4 shows a first memory access instruction (0) to access data in the secure region 202 of memory, executed while the processing circuitry is operating in the secure(S) state. This instruction is allowed to be executed, because the security state of the processing circuitry and the security attribution of the memory access address match.

A second memory access instruction (1) to access data in secure region 202 is also illustrated, but this instruction is executed while the processing circuitry is operating in the non-secure (NS) state. This instruction is therefore not allowed to be executed, because the attribution of the memory access address and the current security state of the processing circuitry do not match.

Finally, a third instruction (2) is shown, which is a data access instruction to access data in the non-secure region 402. This instruction is executed while the processing circuitry is in the secure state(S). However, despite the security attribution of the memory access address not matching the current state of the processing circuitry, this instruction is still allowed to be executed—in this example, when executing in the secure state, the processing circuitry is permitted to access any data in memory. However, it should be noted that this is just one example implementation; it is also possible for the processing circuitry to be restricted to accessing data with a security attribution matching its security state.

Figure 5C:
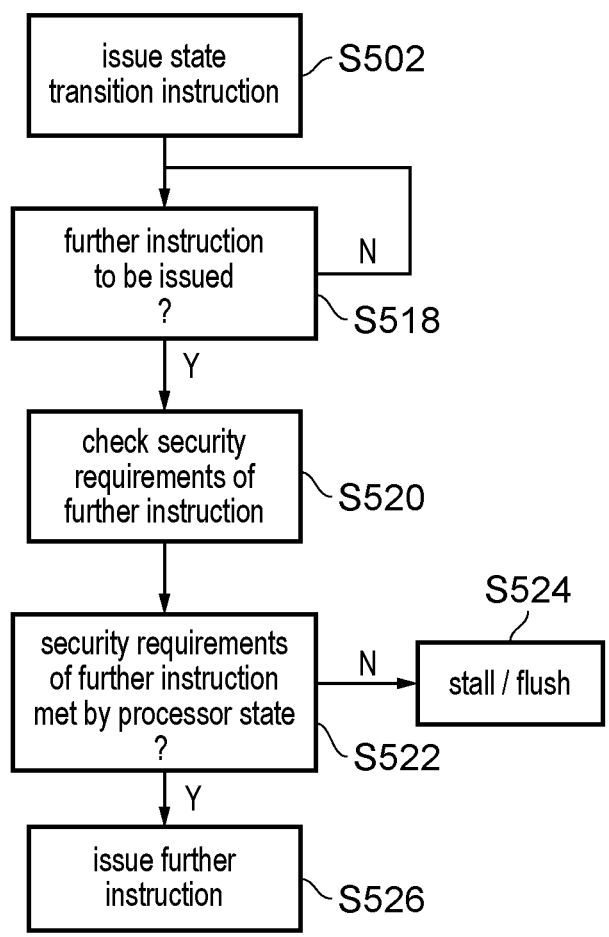

FIGS. 5A to 5C are flow diagrams illustrating a problem to be addressed by the present technique. In particular, FIGS. 5A to 5C illustrate transitions between security states of the processing circuitry 122 in response to state transition instructions.

FIG. 5A Illustrates the response of a typical data processing system to a state transition instruction. In the method described in FIG. 5A, a state transition instruction is issued S502, and a further instruction is issued S504 after the state transition instruction. The state transition instruction is executed S506 by the processing circuitry 122, in order to transition the processing circuitry from one security state to another. In a typical data processing system, the state change is followed by a flush S508 of any non-completed instructions, in order that any instructions identifying the wrong security state can be removed from the pipeline. Any instructions following the state transition instruction (including the further instruction issued previously) are then re-issued S510. This arrangement allows the security of the system to be maintained, by ensuring that any instructions issued match the security state of the present system. The pipeline flush therefore prevents any instructions that were issued on the assumption that the security state was the previous security state from being executed in error. However, requiring a flush to be carried out every time a state change is executed has a significant impact on the performance of the system.

FIG. 5B shows an alternative method for executing a state transition instruction. The method again starts with issuing a state transition instruction S502. However, in this example, the next step S512 involves stalling execution until it is determined S514 that the state transition is complete. Once it is determined that the state transition is complete, the further instruction is issued S516. According to this approach, the performance impacts associated with a flush are avoided, and so the overall performance of the system is improved, when compared with the approach illustrated in FIG. 5A. However, stalling execution still has an impact on the performance of the system, due to the break in execution between the state transition instructions and the further instruction.

FIG. 5C illustrates yet another approach to executing a state transition instruction. The method again starts with a step S502 of issuing a state transition instruction. Next, it is determined S518 whether there is a further instruction to be issued, and this step repeats until it is determined that a further instruction needs to be issued. When it is determined that there is a further instruction to be issued, the security requirements of the further instruction (e.g. the security attribution of a memory access address indicated by the instruction) are checked S520. In particular, it is determined whether or not the security requirements of the further instruction are met by the security state of the processing circuitry. If it is determined S522 that the security requirements of the further instruction are not met by the processor state, a stall or a flush is triggered S524. If the security requirements of the further instruction are met, the further instruction is issued S526. This technique reduces the chance that a flush or a stall will be needed, by checking the security requirements of the further instruction prior to issuing it, which improves the performance of the system. However, since the check is carried out at the time of issuing the instruction, it does not take into account whether or not the state transition has completed. Therefore, the security state of the processing circuitry at the time the further instruction is issued may not match the state of the processing circuitry at the time the further instruction is issued. This could compromise the security system if the further instruction is allowed to execute even if the security state of the system changes between issuing the further instruction and executing it.

Therefore, it would be advantageous to provide an alternative approach to ensuring the security of the processing system, without significantly impacting the performance of the system.

Figure 6:
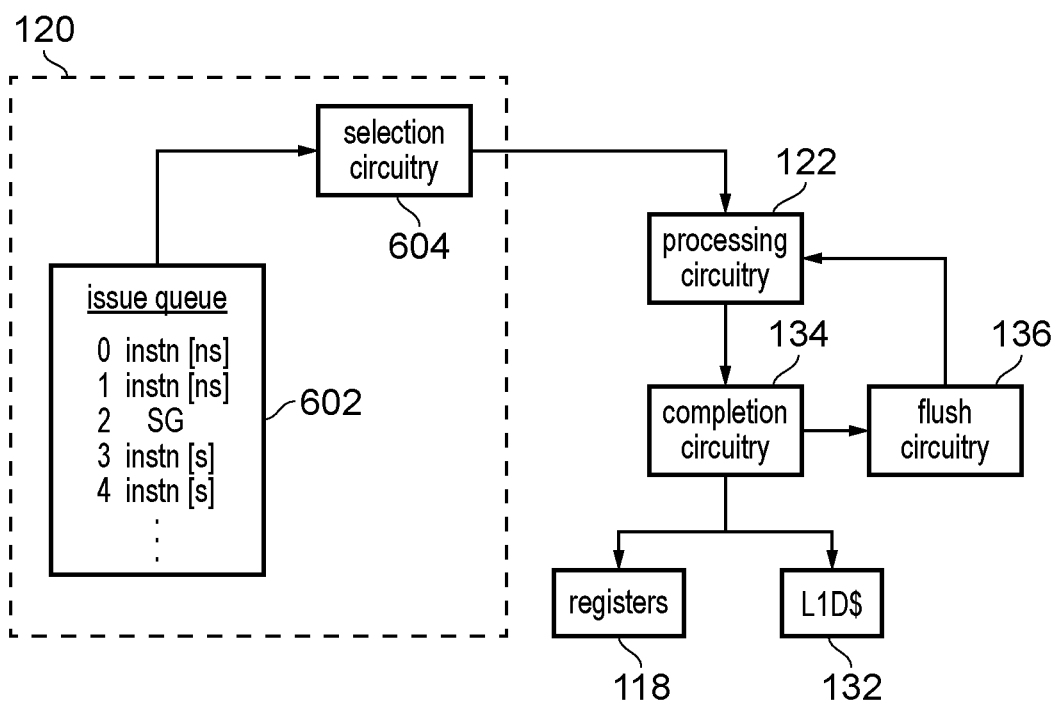
FIG. 6 illustrates a section of a data processing pipeline in accordance with the present techniques.

FIG. 6 illustrates a section of the processor pipeline described in FIG. 1, arranged in accordance with the present technique. Illustrated in FIG. 6 is an issue queue 602 and selection circuitry 604, which are part of the issue circuitry 120 illustrated in FIG. 1. Instructions are selected from the issue queue 602 by the selection circuitry 604 for execution by the processing circuitry 122. The processing circuitry then executes the selected instructions, before completion circuitry 134 performs a completion operation, which may include writing back to any registers 118 or the level one data cache 132, for example, and it may include triggering the flush circuitry 136 to carry out a flush.

As illustrated, instructions in the issue queue may indicate a security state (e.g. secure or non-secure). For example, the instructions may be tagged with a security state requirement, or they may identify memory access addresses that have a particular security attribution. In this example, instructions 0 and 1 in the issue queue 602 indicate the non-secure state, and instructions 3 and 4 indicate the secure state. Also illustrated in the issue queue is a secure gateway instruction (SG), which is an example of an instruction to cause the processing circuitry 122 to transition from the non-secure state to the secure state.

When an instruction is issued from the issue queue 602 to the processing circuitry 122, the processing circuitry 122 speculatively executes the instruction regardless of whether the security state indicated by the instruction matches the security state of the system. Then, during the completion operation carried out by the completion circuitry 134, a check is carried out to determine whether the security state requirement indicated by the instruction is met by a current security state of the processing circuitry. If the required security state indicated by the instruction is met by the current security state of the processing circuitry 122, the instruction is completed, whereas if the required security state of the instruction is not met by the current security state of the processing circuitry 122, the flush circuitry 136 flushes the pipeline. It should be noted that the security state requirements of instructions 0 and 1, which indicate the non-secure state, may be met even if the system is currently operating in the secure state (as discussed above, with reference to FIG. 4). With this arrangement, instructions are speculatively issued from the issue queue 602 without first checking whether their requirements in respect of the security state of the system are met. Since the instructions issued after a state transition (e.g. the secure gateway instruction SG) typically have security state requirements that align with the state into which the processing circuitry will be transitioned, this reduces the likelihood that the pipeline will be stalled or flushed during or following the state transition, and avoids the security risks with issuing an instruction on the basis of the security state of the processing circuitry 122 at the time of issuing, rather than at the time the instruction is executed.

Figure 7:
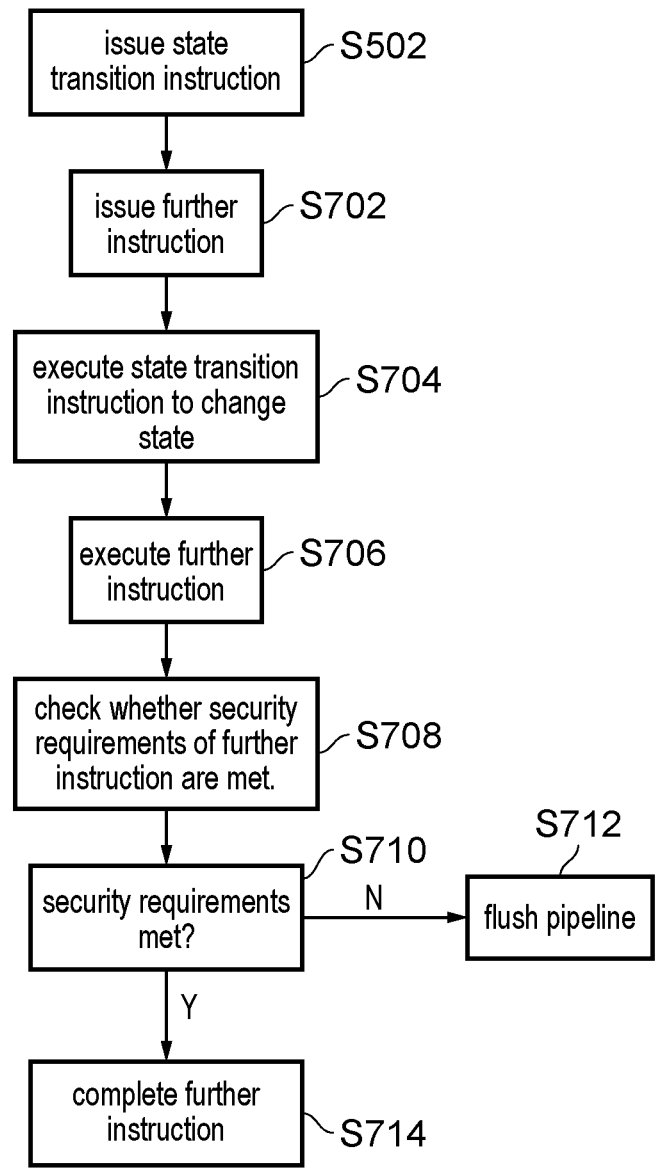
FIG. 7 is a flow diagram illustrating execution of a state transition instruction.

FIG. 7 illustrates a method of executing a state transition instruction according to the present technique. In the method of FIG. 7, a state transition instruction is issued S502, and a further instruction is subsequently issued S702, regardless of whether the security state requirements of the further instruction are met by the security state of the processing system. The state transition Instruction is executed S704 in order to change the security state of the system, and the further instruction is executed S706 regardless, again, of whether the security state requirement of the further instruction, indicated by its security attribution, is met by the security state of the system. Then, after execution of the further instruction, as part of a completion operation carried out by completion circuitry 134, a check S708 is carried out to determine whether the security requirements of the further instruction are met by the current security state of the processing circuitry. If it is determined S710 that the security requirements of the further instruction are not met, the pipeline is flushed S712. It should, however, be noted that the security state requirements of instructions indicating the non-secure state are, in some examples, met even if the processing circuitry is in a secure state. Returning to step S710, if it is determined that the security requirements of the further instruction are met by the security state of the processing circuitry, the further instruction is completed S714.

In accordance with the techniques described above, the performance of the system can be improved by speculatively executing the further instruction regardless of whether its requirement in respect of the security state of the processing circuitry 122 is met at the time of issuing the further instruction. In particular, this avoids the need for a flush to be carried out or execution to be stalled every time the security state of the processor is changed. Thus, the performance impacts associated with flushes and stalls can be avoided.

Some operations executed by the processing circuitry 122 require supplementary operations to also be executed. Therefore, such operations may be injected, in the form of microcode, into the processing pipeline when it is determined that they are needed. In a typical system, when the processing circuitry 122 determines that supplementary operations are needed, any non-completed instructions issued after the operation requiring the supplementary operations are flushed from the pipeline, allowing the microcode associated with the supplementary operations to be injected into the pipeline. However, this approach—due to the flush—has significant performance impacts.

Figure 8:
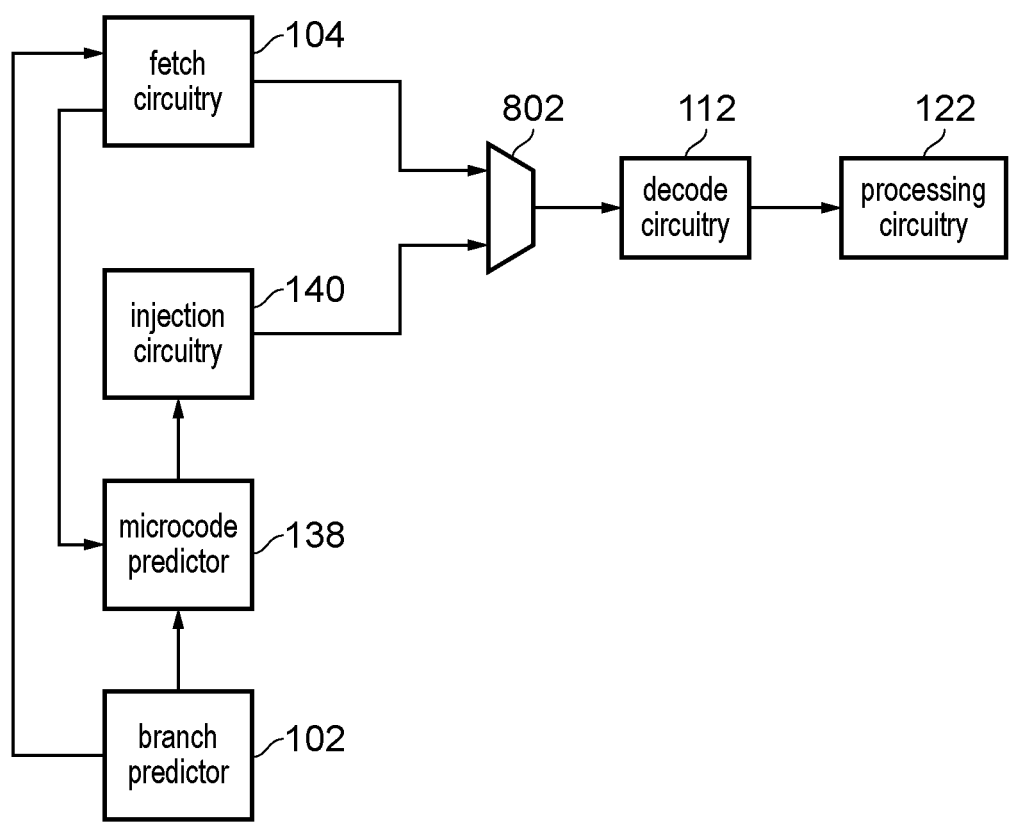
FIG. 8 illustrates a section of a data processing pipeline including a microcode predictor and injection circuitry.

FIG. 8 illustrates a portion of the processing pipeline described in FIG. 1, adapted to predict when supplementary operations will be needed by the processing circuitry 122. In particular, FIG. 8 shows a microcode predictor 138, which provides a prediction of whether or not supplementary operations will be needed by the processing circuitry 122, and based on that prediction causes injection circuitry 140 to inject the corresponding microcode into the pipeline via the multiplexer 802. The multiplexer 802 selects between the injected microcode and instructions fetched by the fetch circuitry 104, and outputs its selection to decode circuitry 112. The decode circuitry 112 decodes the instructions it receives and passes them onto processing circuitry 122 for execution, potentially via rename stage 114 and issue stage 120 (not shown).

By making a prediction of whether or not supplementary operations are likely to be needed by the processing circuitry 122, before it is known for certain whether or not they are needed (e.g. before the instructions requiring the supplementary operations reach the execute stage 122 of the pipeline), and injecting the corresponding microcode into the pipeline in response to the prediction, the present technique reduces the likelihood of a flush being needed, thus improving the performance of the system.

Figure 9A:
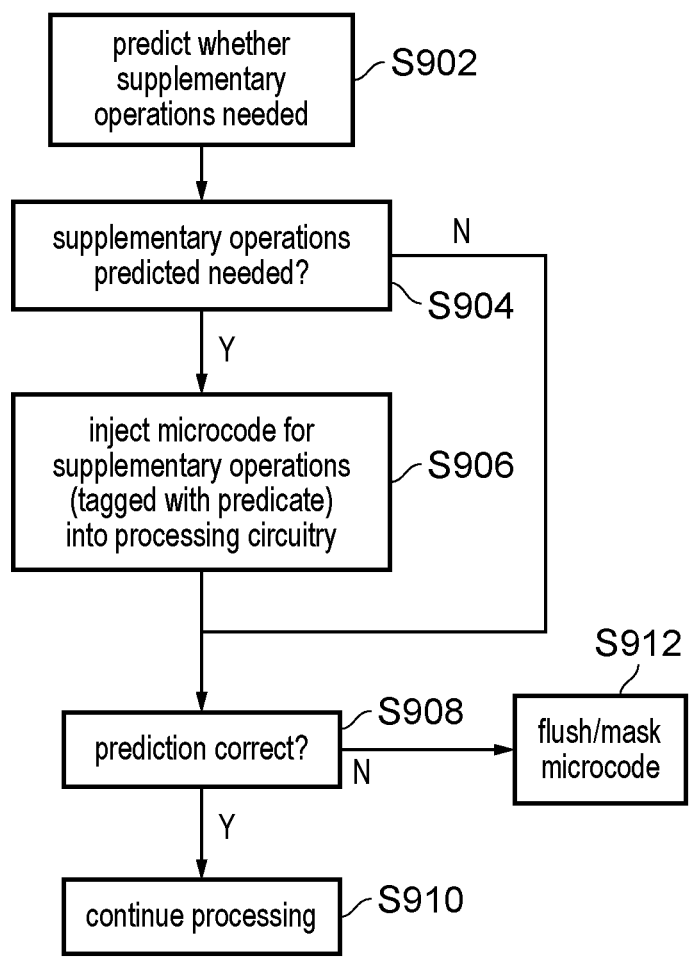
FIGS. 9A and 9B are flow diagrams illustrating the prediction and insertion of supplementary operations.
Figure 9B:
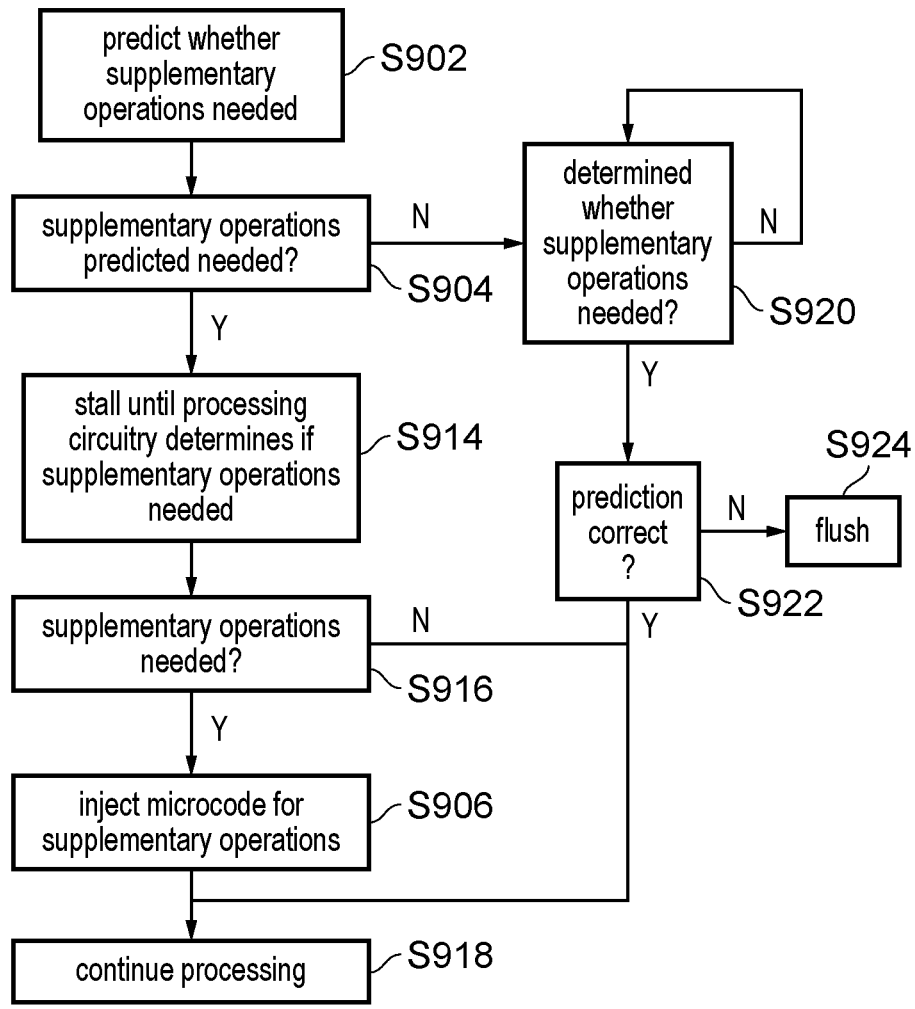

FIGS. 9A and 9B illustrate two examples of predicting whether supplementary operations are needed by the processing circuitry 122 and injecting the corresponding microcode into the pipeline in response.

In the example illustrated in FIG. 9A, the microcode predictor 138 predicts S902 whether or not supplementary operations will be needed by the processing circuitry 122. When it is determined S904 that supplementary operations are needed, the microcode corresponding to the supplementary operation is injected S906 into the processing circuitry. Optionally, the microcode inserted into the processing circuitry may be tagged with a predicate (condition), which corresponds with the prediction. In this way, the instruction is not be executed by the processing circuitry if it is determined that the prediction/predicate was incorrect. If it is predicted that the supplementary operations are not needed then step S906 is skipped.

In a step S908, it is determined whether or not the prediction made in step S904 was correct. If the prediction was correct then processing continues S910, but if the prediction was incorrect then in a step S912 either the supplementary operations are masked using a predicate, to prevent the processing circuitry from executing the supplementary operations, or the pipeline is flushed. More particularly, if the microcode was tagged with a predicate in step S906, the pipeline does not need to be flushed at step S912 when it is determined that the prediction was incorrect. Instead, the processing circuitry responds to the predicate either by not executing the microcode, or by discarding the results of execution of the microcode.

FIG. 9B illustrates an alternative method of predicting whether a supplementary operation is needed by the processing circuitry 122 and stalling the processor pipeline in response. The method again starts with predicting S902 whether supplementary operations are needed. If it is predicted S904 that the supplementary operations will be needed, processing is stalled S914 until the processing circuitry determines whether or not the supplementary operations are actually needed—in other words, whether or not the prediction was correct. If the processing circuitry determines S916 that the supplementary operations are needed, the associated microcode is injected S906 into the processing circuitry, and processing continues S918. If, on the other hand, it is predicted that the supplementary operations are not needed, step S906 is skipped and processing continues S918. Returning to step S904, following a determination that the supplementary operations are not predicted to be needed by the processing circuitry 122, it is later determined S920 whether or not the supplementary operations are actually needed. When it is determined that the supplementary operations are needed, if it is determined S922 that the prediction was correct, then processing continues S918. On the other hand, if it is determined that the prediction was incorrect, then a flush S924 is triggered.

Figure 10A:
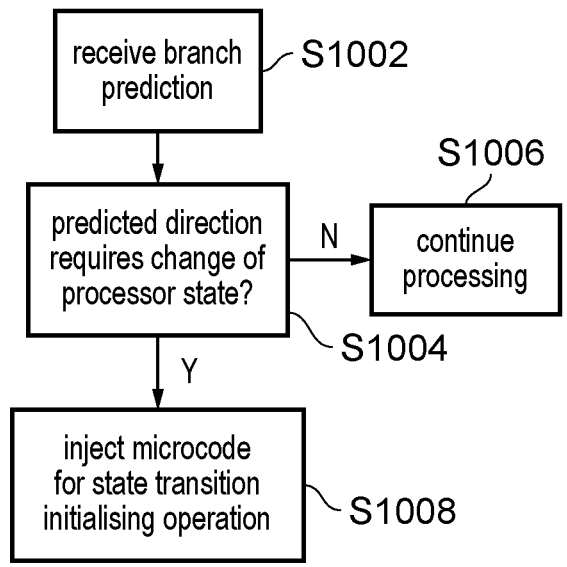
FIGS. 10A and 10B are flow diagrams illustrating predicting whether microcode representing a state transition initialising operation will be needed.
Figure 10B:
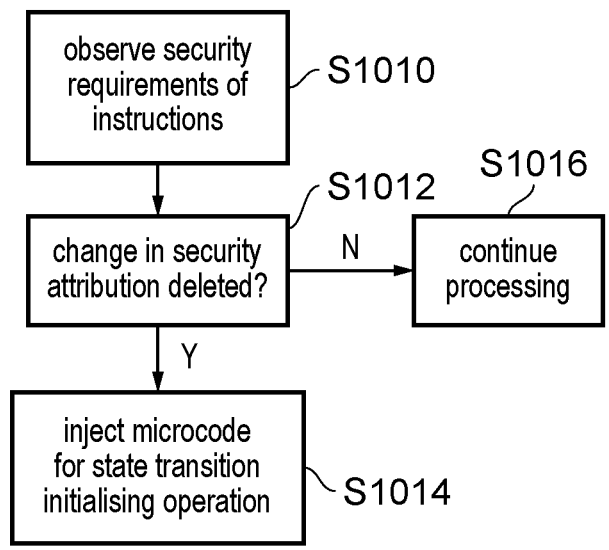

One example of a supplementary operation that may be needed by the processing circuitry 122 is a state transition initialising operation, for initialising the processing circuitry 122 in preparation for a change in the security state of the processor. In such examples, there are a number of ways that the microcode predictor 138 may be arranged to predict whether or not the state transition initialising operation will be needed. FIGS. 10A and 10B provide two examples of how this prediction may be generated.

In the example of FIG. 10A, the microcode predictor receives S1002 a branch prediction from branch prediction circuitry 102. Based on this prediction, the microcode predictor determines S1004 whether or not the predicted direction requires a change in the security state of the processing circuitry 122. If the predicted direction does not require a change in security state, the microcode predictor predicts that no supplementary operations will be needed, and processing continues S1006. On the other hand, if the microcode predictor predicts that there will be a change of security state based on the branch prediction, then microcode for the state transition initialising operation is inserted S1008 into the processing pipeline. In this way, the present technique can be implemented using existing branch prediction structures.

FIG. 10B illustrates an example of predicting whether or not a state transition initialising operation will be needed based on observing the security requirements of instructions in the fetch stage 104. In the method of FIG. 10B, the microcode predictor observes S1010 the security requirements of instructions fetched by the fetch circuitry 104. If the microcode predictor observes S1012 a change in the security requirements, the injection circuitry 140 injects the microcode for the state transition initialising operation into the decode stage S1014. On the other hand, if no change in security attribution is observed, processing continues S1016.

Figure 11:
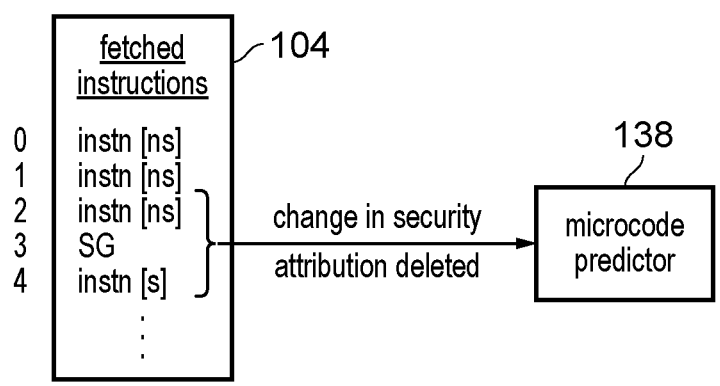
FIG. 11 illustrates a technique for using the security requirements of instructions to predict whether microcode representing a state transition initialising operation will be needed.

FIG. 11 illustrates how the security requirements of fetched instructions may be used to predict whether a state transition initialising operation is needed by the processing circuitry 122. FIG. 11 shows a fetch stage 104 in which a number of instructions have been fetched. Some of the instructions indicate a requirement in respect of the security state of the processing circuitry 122—instructions 0, 1 and 2 indicate the non-secure (NS) state as the required security state, and instruction 4 indicates the secure(S) state. Instruction 3 is a secure gateway (SG) instruction for transitioning the security state of the processing circuitry from the non-secure state to the secure state. In the example of FIGS. 11, the microcode predictor 138 observes the change in security requirement between instruction 2 and instruction 4, from the non-secure state to the secure state. In some examples, this observation involves the microcode predictor 138 observing that the secure gateway (SG) instruction has been fetched, and thus predicting that a change in security state is imminent. In other examples, the microcode predictor 138 observes the security attributions of the fetched instruction. In particular, the microcode predictor 138 observes that the security attribution of instruction 4 (secure) is different to the security attribution of instruction 2 (non-secure), and thus uses this observed change in security requirements to predict that a state transition initialising operation will be needed.

The microcode predictor 138 and injection circuitry 140 may also be used to detect whether supplementary operations corresponding to an array bounds check are needed by the processing circuitry 122 when executing a memory access instruction to access data in an array.

Figure 12:
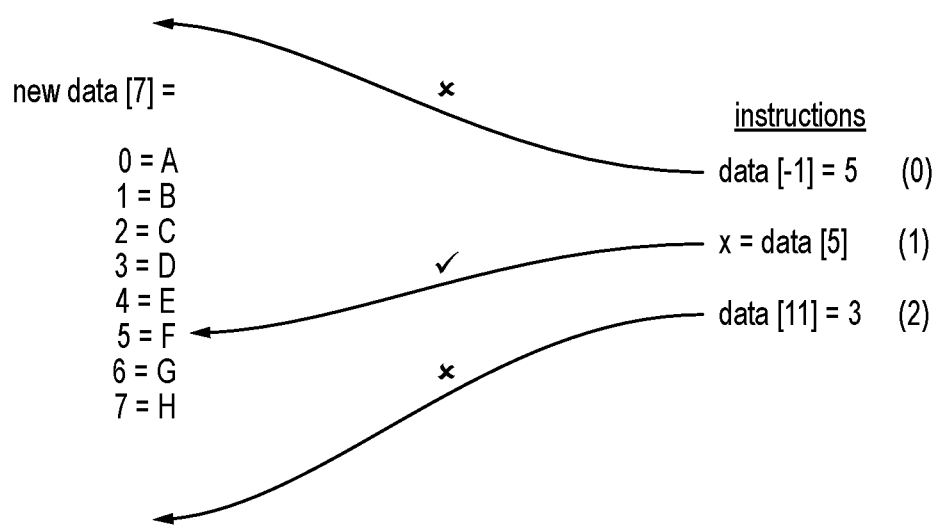
FIG. 12 illustrates a series of data access instructions to access data in an array.

FIG. 12 illustrates accesses to data in an array. In FIG. 12, Instruction 0 is a data access to write data to element −1 of the array. However there is no element −1 in the illustrated array, so this access is invalid. Similarly, instruction 2—which is a request to write a data value to element 11 of the array—is also invalid, because there array only includes 8 elements. On the other hand, instruction 1—a request to read the data stored at element 5 of the array—is valid. In some situations, if such accesses are permitted, this may enable an application to gain access to arbitrary areas of memory, or cause a memory fault to occur. Thus, it would be advantageous for an array bounds check, which would identify instructions 0 and 1 as being invalid, to be executed. It would be beneficial for the microcode predictor 138 to be able to predict in advance whether a supplementary operation corresponding to an array bounds check will be needed.

Figure 13:
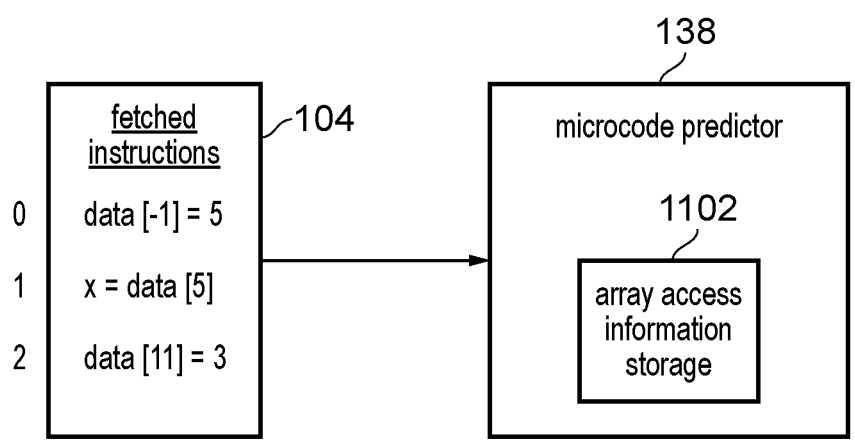
FIG. 13 illustrates a technique for determining whether an array bounds check is needed by the processing circuitry.

There are numerous ways in which the microcode predictor 138 may predict whether or not a supplementary operation corresponding to an array bounds check is needed by the processing circuitry 122. FIG. 13 illustrates one example.

It is useful for the microcode predictor 138 to be able to predict whether an array access operation will require insertion of microcode corresponding to an array bounds check. In FIG. 13, the microcode predictor 138 predicts whether microcode corresponding to an array bounds check will be needed by array access instructions fetched by the fetch circuitry 104 by observing qualities of the fetched instructions. In particular, the microcode predictor 138 includes array access information storage 1102, which stores information about previous array access operations. In particular, the array access information storage 1102 may store indications of whether previous array access operations to a particular target address required an array bounds checks. The microcode predictor 138 can thus predict whether an array bounds check will be needed for an instruction in the fetch queue 104 based on the previously executed array access operations.

The precise mechanism for such a prediction may vary, but in some examples the microcode predictor 138 may predict that an array bounds check is needed whenever it is determined that a previous array access operation specifying the same target address required an array bounds check. When an array bounds check passes for a particular target address and index, the array access information storage 1102 could note this fact so that a future access to the same target address and index (or smaller, non-negative index) is not required. In other examples, the microcode predictor 138 may record the bounds calculated from a previous array bounds check to the same target address, and determine a rate at which the upcoming array access operations are approaching those bounds. For example, the microcode predictor 138 may record that a previous array bounds check for an array access directed towards the array depicted in FIG. 12 were 0 and 7, and may observe that the indices of the executed array access operations have been incrementing by 6 at a time. Based on this, the microcode predictor 138 may predict that the index of instruction 2 will be 11, and that an array bounds check is thus likely to be needed.

It will be appreciated, however, that the precise method used to generate the prediction of whether an array bounds check is needed may vary from the examples given with reference to FIG. 13.

In any case, by providing microcode prediction circuitry 138 and injection circuitry 140, the performance of the system can be improved by reducing the likelihood of a flush later being triggered when it is determined that supplementary operations are needed by the processing circuitry. This improves the overall performance of the system, by avoiding the performance impact of carrying out a flush.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

According to some examples, the present technique includes:

(1) An apparatus comprising:
  processing circuitry to execute instructions;
  prediction circuitry to generate a prediction of a supplementary operation required by one or more of the instructions; and
  injection circuitry to cause microcode corresponding to the supplementary operation to be injected into the processing circuitry in response to the prediction.

(2) The apparatus of clause 1, wherein:
  the prediction circuitry is adapted to generate the prediction based on the one or more of the instructions.

(3) The apparatus of clause 1, comprising:
  branch prediction circuitry to generate a predicted direction of a branch instruction;
  wherein the prediction circuitry is adapted to generate the prediction based on the predicted direction.

(4) The apparatus of clause 1, wherein:
  in response to the prediction, the processing circuitry is adapted to stall execution of the instructions until the microcode is injected into the processing circuitry.

(5) The apparatus of clause 4, wherein:
  the processing circuitry is adapted to determine, in response to the one or more of the instructions, whether the supplementary operation is required; and
  when it is determined that the supplementary operation is required, the injection circuitry is adapted to cause the microcode to be injected into the processing circuitry, and the processing circuitry is adapted to resume execution of the instructions.

(6) The apparatus of clause 1, comprising:
  flush circuitry to generate a flush in response to the prediction being incorrect.

(7) The apparatus of clause 1, wherein:
  the processing circuitry is adapted to suppress execution of the supplementary operation in response to the prediction being incorrect.

(8) The apparatus of clause 7, comprising:
  masking circuitry to suppress the execution of the supplementary operation by applying a predicate to mask the supplementary operation.

(9) The apparatus of clause 1, wherein:
  the processing circuitry is adapted to execute the instructions in a security state;

the supplementary operation is a state transition initialising operation, and the prediction circuitry generates the prediction based on a required change in the security state; and the processing circuitry is adapted to respond to the state transition initialising operation by initialising the processing circuitry for the required change in the security state.

(10) The apparatus of clause 9, wherein:
a subset of the instructions each indicate an address having a security attribution indicative of a requirement in respect of the security state; and the prediction circuitry is adapted to generate the prediction based on the security attribution of each of the subset of the instructions.

(11) The apparatus of clause 10, wherein:
the subset of the instructions are memory access instructions; and
the address is a memory access address.

(12) The apparatus of clause 10, wherein:
the address of each instruction in the subset of the instructions identifies a storage location at which that instruction is stored in a storage circuitry.

(13) The apparatus of clause 9, wherein:
the instructions comprise a branch instruction;
the apparatus comprises branch prediction circuitry to generate a predicted direction of the branch instruction; and
the prediction circuitry is adapted to generate the prediction when the predicted direction indicates the required change in the security state.

(14) The apparatus of clause 13, wherein:
the predicted direction indicates a branch target address of the branch instruction; and
the branch target address has a security attribution indicative of a requirement in respect of the security state.

(15) The apparatus of clause 1, wherein:
the one or more of the instructions correspond with an array access operation, wherein the array access operation identifies a location of an array and an index of the array;
the supplementary operation is an array bounds check operation; and
the processing circuitry is adapted to respond to the array bounds check operation by comparing the index with an array size of the array and returning an error indication when the index is outside of the array size.

(16) The apparatus of clause 1, comprising:
decode circuitry to decode the instructions;
wherein the injection circuitry injects the microcode into the decode circuitry.

(17) A method comprising:
executing instructions;
generating a prediction of a supplementary operation required by one or more of the instructions; and
injecting microcode corresponding to the supplementary operation into the processing circuitry in response to the prediction.

(18) An apparatus comprising:
means for executing instructions;
means for generating a prediction of a supplementary operation required by one or more of the instructions; and means for injecting microcode corresponding to the supplementary operation into the processing circuitry in response to the prediction.

We claim:
1. An apparatus comprising:
processing circuitry adapted to execute instructions from an instruction stream comprising a state transition instruction followed by further instructions in dependence on a security state of the processing circuitry, wherein the processing circuitry is responsive to the state transition instruction to change the security state of the processing circuitry from a secure state to a non-secure state;
issue circuitry adapted to issue the further instructions to be speculatively executed in dependence on the secure state prior to the state transition instruction being completed, each of the further instructions having a requirement with respect to the security state,
wherein the issue circuitry is adapted to issue the further instructions regardless of whether the requirement with respect to the security state is met; and
completion circuitry adapted to perform, after a change in the security state of the processing circuitry in response to executing the state transition instruction, a completion operation on each of the further instructions comprising checking whether the requirement with respect to the security state is met and when the requirement with respect to the security state indicates the non-secure state, completing each of the further instructions.

2. The apparatus of claim 1, wherein:
the requirement with respect to the security state indicates a required security state, and the completion operation comprises checking whether the required security state matches the non-secure state.

3. The apparatus of claim 2, wherein the completion operation comprises:
when the completion circuitry determines that there is a mismatch between the required security state and the non-secure state, triggering a flush.

4. The apparatus of claim 1, wherein:
each of the further instructions indicates a target address, the target address having a security attribution indicative of the requirement with respect to the security state.

5. The apparatus of claim 1, wherein:
during speculative execution of each of the further instructions, the processing circuitry is adapted to delay a state update with respect to each of the further instructions.

6. The apparatus of claim 5, wherein:
the further instructions are part of a block of instructions, each having an identical requirement with respect to the security state; and
the state update with respect to each of the further instructions updates at least one data value visible to instructions outside of the block of instructions.

7. The apparatus of claim 6, wherein:
the state update with respect to each of the further instructions updates the at least one data value in at least one of:
a cache;
a register file; and
a memory.

8. The apparatus of claim 5, wherein:
the completion operation comprises, when the completion circuitry determines that the requirement with respect to the security state is met, issuing the state updates.

9. The apparatus of claim 1, wherein:
the secure state and the non-secure state are non-speculative.

10. A method comprising:
executing instructions from an instruction stream comprising a state transition instruction followed by further instructions in dependence on a security state of processing circuitry;
responsive to the state transition instruction, changing the security state of the processing circuitry from a secure state to a non-secure state;
issuing the further instructions to be speculatively executed in dependence on the secure state prior to the state transition instruction being completed, each of the further instructions having a requirement with respect to the security state,
wherein the further instructions are issued regardless of whether the requirement with respect to the security state is met; and
performing, after a change in security state of the processing circuitry in response to executing the state transition instruction, a completion operation on each of the further instructions comprising checking whether the requirement with respect to the security state is met and when the requirement with respect to the security state indicates the non-secure state, completing each of the further instructions.

* * * * *